(12) United States Patent
Ui et al.

(10) Patent No.: US 7,335,413 B2
(45) Date of Patent: Feb. 26, 2008

(54) FOAM FILLING MEMBER

(75) Inventors: Takehiro Ui, Osaka (JP); Shinji Muto, Osaka (JP); Kazuhiko Kinpara, Osaka (JP)

(73) Assignee: Nitto Denko Corporation, Osaka (JP)

( * ) Notice: Subject to any disclaimer, the term of this patent is extended or adjusted under 35 U.S.C. 154(b) by 242 days.

(21) Appl. No.: 11/119,707

(22) Filed: May 3, 2005

(65) Prior Publication Data

US 2005/0249936 A1    Nov. 10, 2005

(30) Foreign Application Priority Data

May 6, 2004    (JP) .............................. 2004-137644

(51) Int. Cl.
 *B32B 3/06* (2006.01)
(52) U.S. Cl. .................. 428/100; 428/99; 428/120; 296/187.02
(58) Field of Classification Search .............. 428/99, 428/100, 120; 296/187.02
See application file for complete search history.

(56) References Cited

U.S. PATENT DOCUMENTS

| 5,642,914 | A |   | 7/1997  | Takabatake |            |
|-----------|---|---|---------|------------|------------|
| 5,806,915 | A | * | 9/1998  | Takabatake | 296/187.02 |
| 6,146,565 | A |   | 11/2000 | Keller et al. |         |
| 6,649,243 | B2| * | 11/2003 | Roberts et al. | 428/99 |

FOREIGN PATENT DOCUMENTS

| JP | 8-276448   |   | 10/1996 |
|----|------------|---|---------|
| JP | 8-282396   |   | 10/1996 |
| JP | 09207146   |   | 8/1997  |
| JP | 11-254462  |   | 9/1999  |
| JP | 2000-6180  |   | 1/2000  |
| JP | 2002-347055|   | 12/2002 |
| JP | 2002347058 |   | 12/2002 |
| JP | 2003-146243|   | 5/2003  |
| JP | 2004-4445  | * | 1/2004  |
| WO | WO 97/43501|   | 11/1997 |

* cited by examiner

*Primary Examiner*—Alexander S. Thomas
(74) *Attorney, Agent, or Firm*—Akerman Senterfitt; Jean C. Edwards, Esq.

(57) ABSTRACT

A foam filling member having simplified structure is provided that may be produced with improved working efficiency and at low cost. Additionally, the invention enables a reduction in a quantity of foaming material of the foaming base used for filling an interior space of a structure. The foam filling member has an annular wall formed on a supporting plate and an annular foaming portion of the foaming base supported on an outer supporting portion located at the outside of the annular wall on the supporting plate. A plurality of openings are formed in the annular wall and also lugs are formed that project into an inner closed portion at the inside of the annular wall through the respective openings.

8 Claims, 5 Drawing Sheets

FOAM FILLING MEMBER

BACKGROUND OF THE INVENTION

1. Field of the Invention

The present invention relates to a foam filling member used for filling a space of a structure with foam.

2. Description of the Prior Art

A foam filling member used for filling foaming material in a hollow structure, such as a pillar of a vehicle, is generally known.

For example JP Laid-open (Unexamined) Patent Publication No. 2003-146243 proposes a foam filling tool as an example of the foam filling member, which comprises a foaming base material formed of material which is foamed by heating from outside, a supporting member having a supporting plate for supporting one side of the foaming base material, the foaming base material being formed in generally annular form to correspond in size to the supporting plate, and an annular weir wall, projected from one side of the supporting plate, for supporting an inner circumferential wall of the foaming base material.

According to this foam filling tool, when the foaming base material is heated from outside after the foam filling tool is set in place in a hollow room such as a pillar of a vehicle, the foam filling of the foaming base material is suppressed with respect to a longitudinal direction of the hollow room by the supporting plate and is accelerated with respect to a direction substantially orthogonal to the longitudinal direction orienting toward the inner circumferential wall of the hollow room to produce the foam. Also, this foam filling of the foaming base material is prevented from progressing toward a center of an opening of the foaming base material by the annular weir wall of the supporting plate. This can allow the effective and smooth filling of the hollow room with the foam produced using a very small quantity of foaming base material to be foamed by heating.

In the foam filling tool described in JP Laid-open (Unexamined) Patent Publication No. 2003-146243, the weir wall and a retaining claw for retaining the foaming base material to the supporting plate are provided separately from each other on the supporting member. Due to this, the foaming base material must be retained to the retaining claw, while the foaming base material is placed around the weir wall, for fixing the foaming base material to the supporting plate, thus making the fixing work cumbersome and complicated.

Also, since the supporting member itself is also required to have the configuration that the retaining claw is arranged separately from the weir wall on the supporting member, a molding cavity of a molding die for molding the supporting member is complicated in shape, thus causing cost increase.

SUMMARY OF THE INVENTION

It is an object of the invention to provide a foam filling member which is simplified in structure so that it can be produced with improved working efficiency and at low cost and can also reduce a quantity of foaming material of the foaming base material used for filling an interior space of a structure to leave no space therein.

The present invention provides a novel foam filling member used for filling a space of a structure by foaming it, which comprises a holder formed of non-foamable material, and a foaming base material of foamable material, wherein the holder comprises a supporting plate for supporting the foaming base material, an annular wall standing from the supporting plate in a direction orthogonal to an extending direction of the supporting plate and formed in a ring-shaped form to define a certain space in the inside of the annular wall, and an engaging portion, provided in the annular wall, to engage with the foaming base material, and wherein the foaming base material comprises an annular foaming portion of the supporting plate supported on an outer circumferential portion of the annular wall, and an engaged portion to be engaged with the engaging portion.

In this foam filling member, since the annular wall has the engaging portion to engage with the foaming base material, the molding shape for molding the holder can be simplified in shape. Hence, the foam filling member can be produced at a low cost. Also, when the foaming base material is fixed to the holder, the engaged portion can be retained to the engaging portion at the same time that the annular foaming portion is arranged around the outside of the annular wall. Hence, the foam filling member can be produced with improved working efficiency.

Besides, in the foam filling member, when the foam filing member is disposed in the space of the structure and the foaming base material is foamed, the foam filling of the foaming base material is blocked by the supporting plate. Hence, the foam filling can be controllably guided in the opposite direction to the supporting plate. Further, the foam filling of the annular foaming portion toward the certain inner space of the annular wall can be suppressed by the annular wall. Hence, the space of the structure can be filled up effectively, leaving no space therein, while a quantity of foaming base material used is decreased.

In the foam filling member, it is preferable that the foaming base material is formed in sheet form.

Forming the foaming base material in sheet form can provide the advantage that the foaming base material can be produced by the continuous molding with improved production efficiency and at low cost.

In the foam filling member, it is preferable that the engaging portion of the holder has a slit opening opened in a circumferential direction of the annular wall, and that the engaged portion of the foaming base material has a lug projecting from the annular foaming portion into a certain space at the inside of the annular wall through the opening.

The provision of the lug can allow the engaged portion of the foaming base material to engage with the engaging portion of the holder simply by inserting the lug from the annular foaming portion at the outside of the annular wall into the certain space at the inside of the annular wall through the opening. Hence, further improved working efficiency can be provided.

Also, since the lug is expanded at their free ends projecting into the certain space at the inside of the annular wall by the foaming, improved reliability for engagement of the engaged portion with the engaging portion at the foaming can be provided.

In this foam filling member, it is preferable that the engaging portion of the holder has, in the opening, claw portions, projected inwardly of the opening along a circumferential direction of the annular wall, to hold the lug in sandwich relation between the supporting plate and the claw portions.

The provision of the claw portions can allow the lug to be held in sandwich relation between the claw portions and the supporting plate at the opening. Hence, improved reliability for engagement of the engaging portion with the engaged portion can be provided.

In the foam filling member, it is preferable that the engaged portion of the foaming base material has protruding portions protruding along the circumferential direction of the annular wall from free ends of the lug projecting into the certain space at the inside of the annular wall.

The provision of the protruding portions can allow the annular wall to be held in sandwich relation between the protruding portions and the annular foaming portion. Hence, improved reliability for engagement of the engaged portion with the engaging portion can be provided.

In the foam filling member, it is preferable that the annular wall is formed to have a height larger than a thickness of the foaming base material.

When the annular wall is formed to have a height larger than a thickness of the foaming base material, the annular foaming portion, when foamed, can be prevented from flowing over the annular wall and filling into the certain space at the inside thereof. Hence, the space of the structure can be filled up further reliably, leaving no space therein, while a quantity of foaming base material used can be decreased.

In the foam filling member, it is preferable that the holder has a mounting portion to be mounted on the structure, and the mounting portion has an embedding portion in which part of the foaming base material is embedded.

The provision of the protruding portions can allow the foaming base material to be foamed at the mounting portion as well in the state of being embedded in the embedding portion. Hence, the structure can also be filled up further reliably at a portion thereof on which the mounting portion is to be mounted, leaving no space therein.

In the foam fling member, the holder may have the annular wall and the engaging portion formed on each side of the supporting plate, and the foaming base material may be supported on the each side of the supporting plate.

In the arrangement wherein the foaming base material is supported on each side of the supporting plate, the foaming base materials can be foamed on both sides of the supporting plate, thus allowing the sufficient foam filling. Also, this arrangement can allow simultaneous foam filling in a symmetrical hollow structure like the vehicle pillar by using the same supporting plate.

DETAILED DESCRIPTION OF THE PREFERRED EMBODIMENTS

Figure 1:
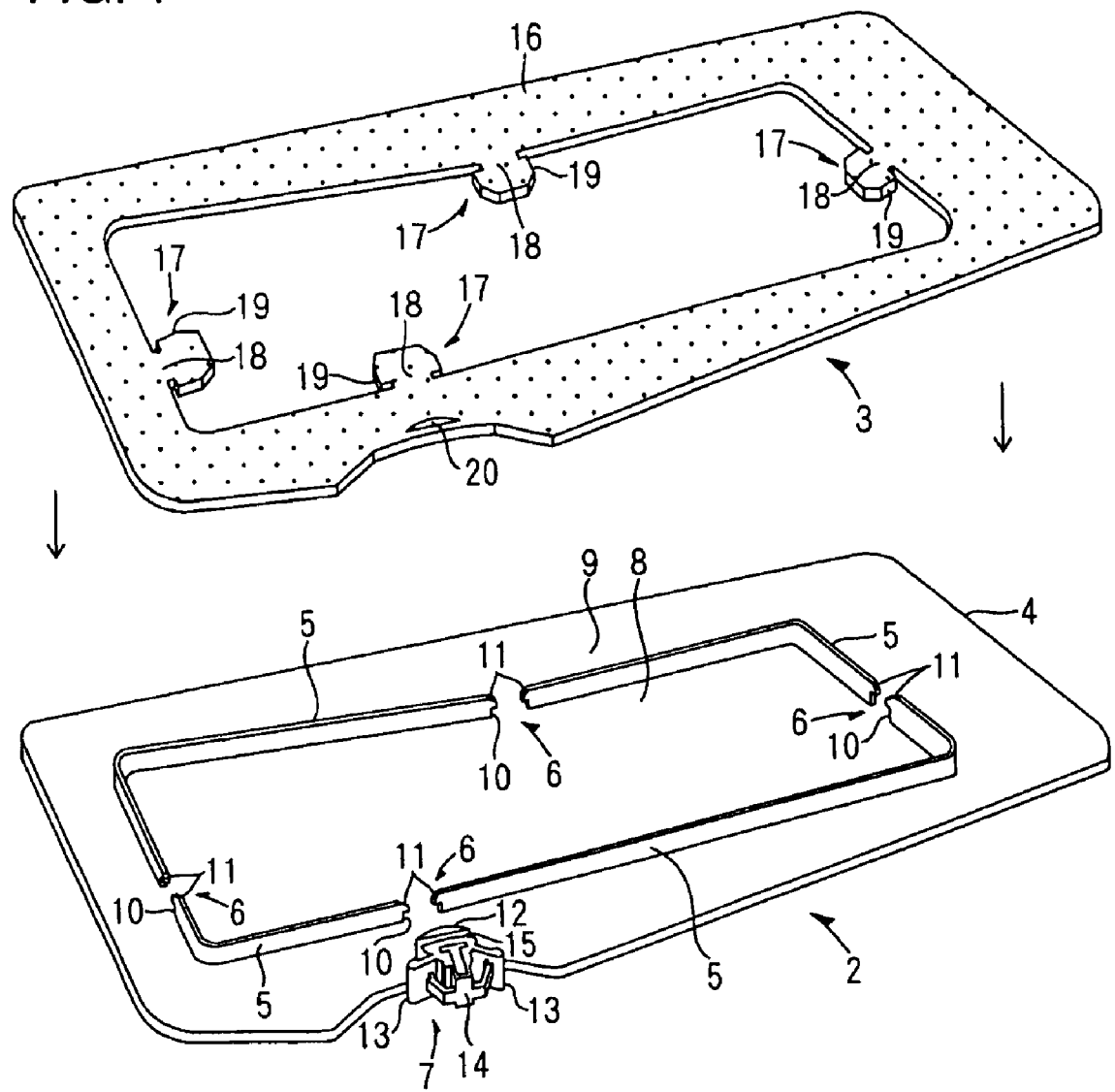
FIG. 1 is an exploded perspective view showing an embodiment of a foam filling member of the present invention.
Figure 2:
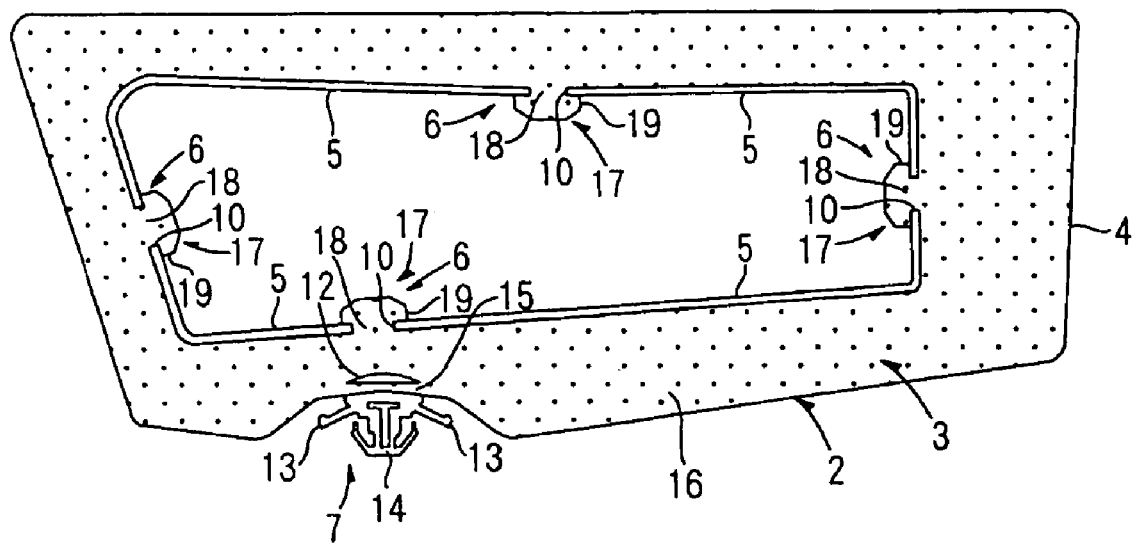
FIG. 2 is a plane view of the foam filling member shown in FIG. 1.

FIG. 1 is an exploded perspective view showing an embodiment of a foam filling member of the present invention, and FIG. 2 is a plane view of the foam filling member shown in FIG. 1.

In FIG. 1, a foam filling member 1, which is used for filling foaming material in an interior space of a hollow structure, such as a pillar of a vehicle, comprises a holder 2 of non-foamable material and a foaming base material 3 of foamable material.

The material of the holder 2 is not limited to any particular one, as long as it can support the foaming base material 3 foamed by heating as mentioned later (e.g. about 120° C. to about 210° C.) to prevent drooping or dropping down under its own weight. The materials that may be used include, for example, resins, such as nylon and polyester, and metals, such as iron, stainless steel, and aluminum.

The holder 2 comprises a supporting plate 4, an annular wall 5, engaging portions 6 and a mounting portion 7 which are formed in one piece.

The supporting plate 4 has a figure slightly smaller than and similar to a space of a structure to be filled, having a rectangular flat plate shape to support the foaming base material 3. It has a thickness of e.g. 0.8-3.0 mm, or preferably 1.0-2.0 mm.

Figure 3:
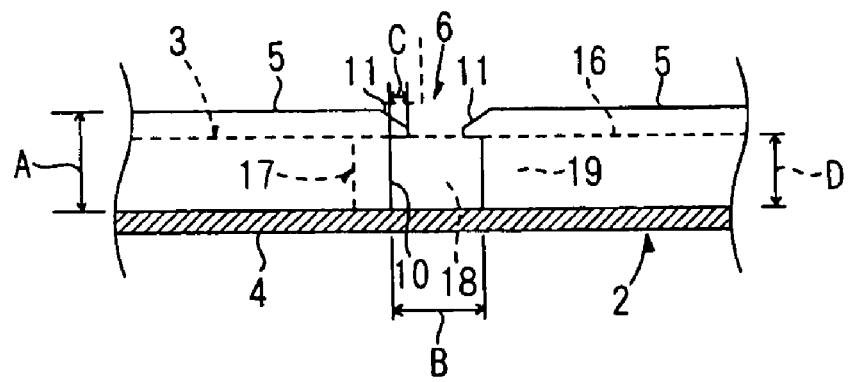
FIG. 3 is a side view of a principal part of a holder of the foam filling member shown in FIG. 1.

The annular wall 5 has a generally rectangular ring shape substantially similar to an outer shape of the supporting plate 4, standing from one side of the supporting plate 4 in a direction orthogonal to an extending direction of the one side of the supporting plate 4. The annular wall 5 in annular form is provided on the one side of the supporting plate 4 at a predetermined spaced position from an outer edge of the supporting plate 4, between which an annular foaming portion 16 of the foaming base material 3 mentioned later is placed. As shown in FIG. 3, the annular wall 5 has a height A (or a length from the one side surface of the supporting plate 4 to a free end of the annular wall 5) larger than a thickness D of the foaming base material 3. It has a height of e.g. 2.0-10.0 mm, or preferably 3.0-7.0 mm. The formation of the annular wall 5 provides an inner space surrounded by the annular wall 5 on the supporting plate 4, which is defined as an inner closed portion 8. It also provides an outer space at an outside of the annular wall 5 or between around the outer edge of the supporting plate 4 and the annular wall 5, which is defined as an outer supporting portion 9.

The engaging portions 6 comprise openings 10 and claw portions 11 and are provided in the annular wall 5.

The openings (four openings) 10 are formed at predetermined spaced locations in the circumferentially extending direction of the annular wall 5. The respective openings 10 are formed by partly opening the annular wall 5 in slit form along the circumferential direction of the annular wall 5. Each opening 10 in the annular wall 5 is formed in generally rectangular form, when viewed from side elevation as shown in FIG. 3, to communicate between the inner closed portion 8 and the outer supporting portion 9. The each opening 10 has a width B, or a length extending along the circumferential direction of the annular wall 5, of e.g. 3.0-30.0 mm, or preferably 5.0-15.0 mm.

The claw portions 11 are formed in pairs in the respective openings 10. Specifically, each pair of claw portions 11 are formed by upper portions of the annular walls 5 arranged opposite to each other across the opening 10 being projected from their side end portions inwardly of the opening 10 along the circumferential direction of the annular wall 5, to be closer to each other. The each pair of claw portions 11 are formed in trapezoid form, as viewed from side elevation, with their upper edges slanting downwardly toward inside and their lower edges extending in substantially parallel with the supporting plate 4, and are arranged opposite to each other at a predetermined space in the circumferential direction of the annular wall 5. Also, the pair of claw portions 11 are spaced from the one side surface of the supporting plate 4 so that their lower edges can be positioned at a level substantially equal to a thickness of the foaming base material 3. The respective claw portions 11 are formed to be elastically deformable, and their lower edges have an overhang length C extending from the annular wall 5 of e.g. 0.1-5.0 mm, or preferably 0.5-1.5 mm.

Figure 5:
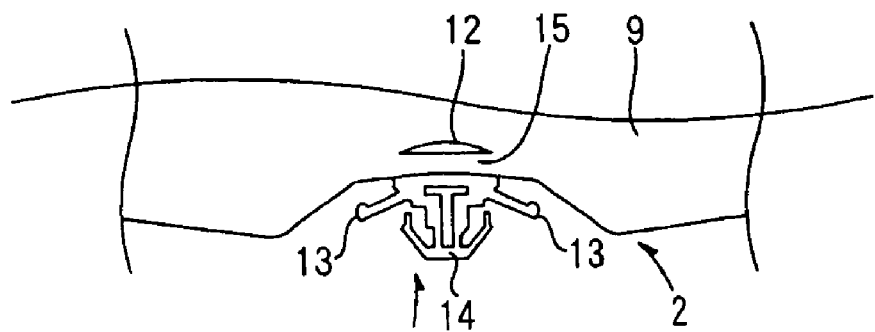
FIG. 5 is a plane view of a principal part of a mounting portion of the holder of the foam filling member shown in FIG. 1.

The mounting portion 7 is formed to project outwardly from the outer edge of the supporting plate 4 along the extending direction of the supporting plate 4, as shown in FIG. 5. The mounting portion 7 comprises a base 12, inner retaining portions 13 and an outer retaining portion 14 which are provided in the base 12, and an embedding portion 15 in which the foaming base material 3 is embedded, which are formed in one piece.

The base 12 is provided at a position around the outside edge of the supporting plate 4 and is formed to protrude in a direction substantially orthogonal to the supporting plate 4 from the outside edge thereof.

The inner retaining portions 13 are formed by flexible arms which are formed to project out from a base end of the base 12 along a widthwise direction of the base 12 (a direction for the base 12 to extend along the outside edge of the supporting plate 4) and slant outwardly in a projecting direction of the base 12. The outer retaining portion 14 is formed to project out from a free end of the base 12 in the projecting direction of the base 12. The outer retaining portion 14 is formed by flexible arched arms of elastically deformable along the widthwise direction of the base 12.

The embedding portion 15 is formed in slot form at a base portion of the base 12, to extend along a direction orthogonal to the projecting direction of the base 12.

For example when the holder 2 is formed of resin cited above, it can be produced by subjecting the resin to the injection molding to form the supporting plate 4, the annular wall 5, the engaging portion 6 and the mounting portion 7 in one piece.

The foaming base material 3 is formed of foaming material which is foamed by heating (e.g. at about 120° C. to about 210° C.).

Any known foamable polymer is used as the foaming material without any particular limitation. The foamable polymers that may be used include, for example, resins, such as ethylene•vinyl acetate copolymer, polyethylene, polypropylene, polyester, polyvinyl butyral, polyvinyl chloride, polyamide, and polyketone, and rubbers, such as styrene-butadiene rubber (SBR), and polybutadiene rubber (BR). Preferably, ethylene•vinyl acetate copolymer is used as the foaming material. The use of ethylene•vinyl acetate copolymer can provide an increased foam ratio. At least one or two materials of foamable polymer can be properly selected from these foamable polymers.

For enhancement of the foaming and curing of the foamable polymer, for example a cross-linking agent, a foaming agent, and, if necessary, a foam auxiliary agent, may be mixed further in the foaming material.

No particular limitation is imposed on the cross-linking agent, while for example a known radical forming agent that can be dissolved by heating to produce a free radical so as to form a cross-linking bond among molecules or in an individual molecule is used as the cross-linking agent. To be more specific, the radical forming agents that may be used include, for example, organic peroxides, such as dicumyl peroxide, 1,1-ditertiarybutylperoxy-3,3,5-trimethylcyclohexane, 2,5-dimethyl-2,5-ditertiarybutylperoxyhexane, 2,5-dimethyl-2,5-ditertiary-butylperoxyhexyne, 1,3-bis(tertiary-butylperoxyisopropyl)benzene, tertiary-butylperoxyketone, and tertiarybutylperoxybenzoate.

When the foamable polymer is to be vulcanized, a known vulcanizing agent can be used as the cross-linking agent. No particular limitation is imposed on such a vulcanizing agent. For example, sulfur, sulfur compounds, selenium, magnesium oxide, lead oxide, zinc oxide, polyamines, oximes, nitroso compounds, resins, and ammonium salts can be cited as the vulcanizing agent.

At least one or two materials of these cross-linking agents can be selectively used. No particular limitation is imposed on a mixing ratio of the cross-linking agent. For example, a mixing ratio of the cross-linking agent to the foamable polymer is in the range of 0.1-10 parts by weight, or preferably in the range of 0.5-7 parts by weight.

When the vulcanizing agent is used, a vulcanization accelerator may be used in combination. Known vulcanization accelerators including, for example, dithiocarbamine acids, thiazoles, guanidines, sulfenamides, thiurams, xanthogen acids, aldehyde ammonias, aldehyde amines, and thioureas, may be used. At least one or two materials of these vulcanization accelerators may be selectively used. A mixing ratio of the vulcanization accelerator to the foamable polymer is in the range of 0.1-5 parts by weight.

On the other hand, rather than the vulcanization accelerators, known vulcanization retardants such as, for example, organic acids and amines, may be properly selected for the mixture, for the purpose of molding control.

Also, no particular limitation is imposed on the foaming agent. For example, known inorganic or organic foaming agents are used. The inorganic foaming agents that may be used include, for example, ammonium carbonate, ammonium hydrogen carbonate, sodium hydrogen carbonate, ammonium nitrite, sodium borohydride, and azides.

The organic foaming agents that may be used include, for example, azo compounds, such as azodicarbonamide barium azodicarboxylate, azobisisobutyronitrile, and azodicarboxylic amide, nitroso compounds, such as N,N'-dinitrosopentamethylenetetramine, N,N'-dimethyl-N,N'-dinitrosotereph-thalamide, and trinitrotrimethyltriamine, hydrazide compounds, such as 4,4'-oxybis(benzenesulfonylhydrazide), paratoluene sulfonylhydrazide, diphenylsulfone-3,3'-disulfonylhydrazide, and allylbis(sulfonylhydrazide), semicarbazide compounds, such as p-toluilene sulfonylsemicarbazide, and 4,4'-oxybis(benzenesulfonylsemicarbazide), alkane fluorides, such as trichloromonofluoromethane, and dichloromonofluoromethane, and triazole compounds, such as 5-morpholyl-1,2,3,4-thiatriazole.

Among these foaming agents, the one that is dissolved at a temperature equal to or higher than a softening temperature of foamable polymer to generate gas and is hardly foamed in the process of forming the foaming base material 3 is selected properly in accordance to the composition thereof. The foaming agent that is foamed in a temperature range between about 120° C. and about 210° C. is preferably used.

At least one or two materials of these foaming agents can be selectively used. No particular limitation is imposed on a mixing ratio of the foaming agent. For example, a mixing ratio of the foaming agent to the foamable polymer is in the range of 5-50 parts by weight, or preferably in the range of 10-30 parts by weight, per 100 parts by weight of foamable polymer.

A quantity of foaming agent mixed is preferably in such a range that the foaming base material 3 containing the foaming agent, when foamed, practically generates a closed cell at about five to about twenty-five times, or preferably about ten to about twenty times, the foam ratio that the foaming base material containing no foaming agent does. When an excessively small quantity of foaming agent is mixed, the foaming base material 3 is not foamed sufficiently, while on the other hand, when an excessively large quantity of foaming agent is mixed, a resin drip of the foaming material obtained by the foaming is caused to thereby produce a void in the foamed resin, both causing filling loss.

No particular limitation is imposed on the foam auxiliary agent. For example, a known foam auxiliary agent may be selected properly in accordance to the type of foaming agent used. To be more specific, for example, urea compounds containing urea as a main component, metal oxides, such as zinc oxide, and lead oxide, higher fatty acids, such as salicylic acid, and stearic acid, or metal salts thereof can be cited as the foam auxiliary agent. A metal salt of a higher fatty acid is preferably used.

At least one or two materials of these foam auxiliary agents can be selectively used. No particular limitation is imposed on a mixing ratio of the foam auxiliary agent. For example, a mixing ratio of the foam auxiliary agent to the foamable polymer is in the range of 1-20 parts by weight, or preferably in the range of 5-10 parts by weight, per 100 parts by weight of foamable polymer.

Further, known additives including, for example, stabilizer, stiffener, filler, and softener and, if required, for example, plasticizer, age resister, antioxidant, pigment, colorant, fungicide, and flame retardant, may be additionally mixed properly for intended purposes and applications, within the range of having little influence on the physicality of the foam obtained.

The foaming base material 3, comprising the annular foaming portion 16 and engaged portions 17 formed integrally therewith, is formed in sheet form. The foaming base material 3 has a thickness D (FIG. 3) of e.g. 0.5-6.0 mm, or preferably 1.5-3.5 mm.

Forming the foaming base material 3 in sheet form can provide the advantage that the foaming base material 3 can be produced by the continuous molding with improved production efficiency and at low cost.

The annular foaming portion 16 has a generally rectangular ring-shaped and a flat plate form corresponding in shape to the outer supporting portion 9 of the supporting plate 4, as shown in FIG. 1.

Figure 4:
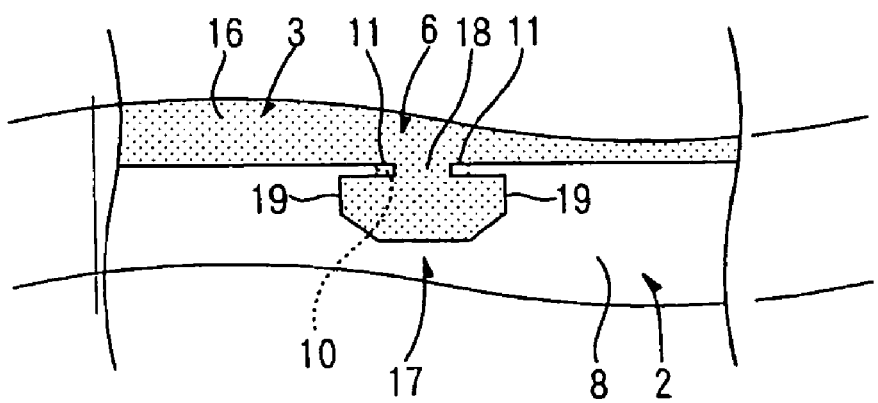
FIG. 4 is a plane view of a principal part of the foam filling member shown in FIG. 1.

Each engaged portion 17 comprises a lug 18 and protruding portions 19 formed integrally therewith and is formed in a generally T-shape when viewed from top, as shown in FIG. 4.

The lugs 18 are provided at locations corresponding to the openings 10 of the annular wall 5 when the foaming base material 3 is supported by the holder 2. Each lug 18 has a generally rectangular shape having a width slightly narrower than a width B of the opening 10, projecting from the annular foaming portion 16 inwardly or in a direction generally orthogonal to a circumferential direction of the annular foaming portion 16.

The protruding portions 19 are formed to protrude from free ends of the lug 18 toward both circumferential sides of the annular foaming portion 16. The protruding portions 19 are provided at spaced intervals corresponding to the thickness of the annular wall 5 from the annular foaming portion 16, confronting the annular foaming portion 16.

The annular foaming portion 16 of the foaming base material 3 has an incision 20 for embedding a part of the annular foaming portion 16 in the embedding portion 15. The incision 20 is formed to extend along a longitudinal direction of the embedding portion 15 at a location corresponding to the base 12 arranged at the opposite side to the projecting side with respect to the embedding portion 15, as shown in FIG. 1.

The foaming base material 3 is produced in the following processes, for example. First, after the respective components cited above are mixed in the foaming material at a mixing ratio mentioned above, the mixture is kneaded using a mixing roll, a pressure kneader, and the like. Then, the resulting material is continuously formed in sheet form by the continuous molding using a press, a calender roll, or the like or by the extrusion using e.g. an extruder. Sequentially, the resulting sheet is stamped to form the annular foaming portion 16, the engaged portion 17, and the incision 20 in the sheet. The foaming base material 3 can be produced in the processes mentioned above.

The foaming base material 3 thus produced is mounted on the holder 2 in the following manner. As shown in FIGS. 1 and 2, the annular foaming portion 16 is supported on the outer supporting portion 9 of the supporting plate 4 and also the respective lugs 18 are fitted in their respective openings 10 from above the openings 10, while the claw portions 11 of each pair are elastically deformed. At the same time as this, the base 12 is inserted in the incision 20 to fit the part of the annular foaming portion 16 into the embedding portion 15. The foaming base material 3 is mounted on the holder 2 in this manner.

The respective lugs 18 of the foaming base material 3 are arranged to extend from the annular foaming portion 16 at the outside of the annular wall 5 toward the inner closed portion 8 at the inside of the annular wall 5 through the respective openings 10. The lugs 18 are held in sandwich relation between the claw portions 11 of each pair and the supporting plate 4. This arrangement prevents vertical movement of the lugs 18. Also, the protruding portions 19 formed at the free ends of the each lug 18 are extended along the circumferential direction of the annular wall 5, and the respective parts of the annular wall 5 are held in sandwich relation between the protruding portions 19 and the annular foaming portion 16 at their respective side ends (arranged in the circumferential direction of the annular wall 5 to confront each other across the openings 10). This arrangement prevents the pulling of the lugs 18 from the openings 10. By this engagement of the engaged portions 17 of the foaming base material 3 with the engaging portions 6 of the holder 2, the foaming base material 3 is fixed to the holder 2 simply and reliably.

The foam filling member 1 thus constructed can provide simple and easy retention of the foaming base material 3 by simply inserting the lugs 18 of the foaming base material 3 from the annular foaming portion 16 at the outside of the annular wall 5 into the inner closed portion 8 at the inside of the annular wall 5 through the openings 10. This can provide improved efficiency of the mounting work of the foaming base material 3 on the holder 2.

Also, the vertical movement of the lugs 18 is prevented by the lugs 18 held in sandwich relation between the claw portions 11 of each pair and the supporting plate 4 at the openings 10 in this fitted state. This can provide improved reliability for engagement.

In addition, the pulling of the lugs 18 from the openings 10 is also prevented by the annular wall 5 held in sandwich relation between the protruding portions 19 and the annular foaming portions 16 at the openings 10 in the fitted state. This can provide improved reliability for engagement.

Further, the lugs 18 are expanded at their free ends and their protruding portions 19 located in the inner closed portion of the annular wall 5 by foaming. This can provide further improved reliability for engagement at the foaming.

The foam filling member 1 thus produced is disposed in a space defined between structures or in an interior space of a hollow structure and then is heated to a foaming temperature (e.g. about 120° C. to about 210° C.). Then, the foam filling member 1 is foamed and thereby the space is filled up, without leaving any space therein. Therefore, this foam filling member 1 can be used as foam filling members of a variety of industrial fields, including, for example, vibration-proof material, soundproof insulator, dust-proof material, heat-proof material, cushioning material, and water-proof material, for the purposes of damping, noise reduction, dust control, heat insulation, shock-absorbing, and water tight, without being limited to any particular ones.

To be more specific, when this foam filling member 1 is used for filling a hollow structure such as, for example, an interior space of a pillar of a vehicle by foaming, vibrations and noises of a vehicle engine or hissing sounds or fluttering sounds of the vehicle can be effectively prevented from being transmitted to the vehicle interior by the foam produced by foaming.

Next, a method of filling up the interior space of the pillar of the vehicle will be explained, taking an example of use of this foam filling member 1.

Figure 6:
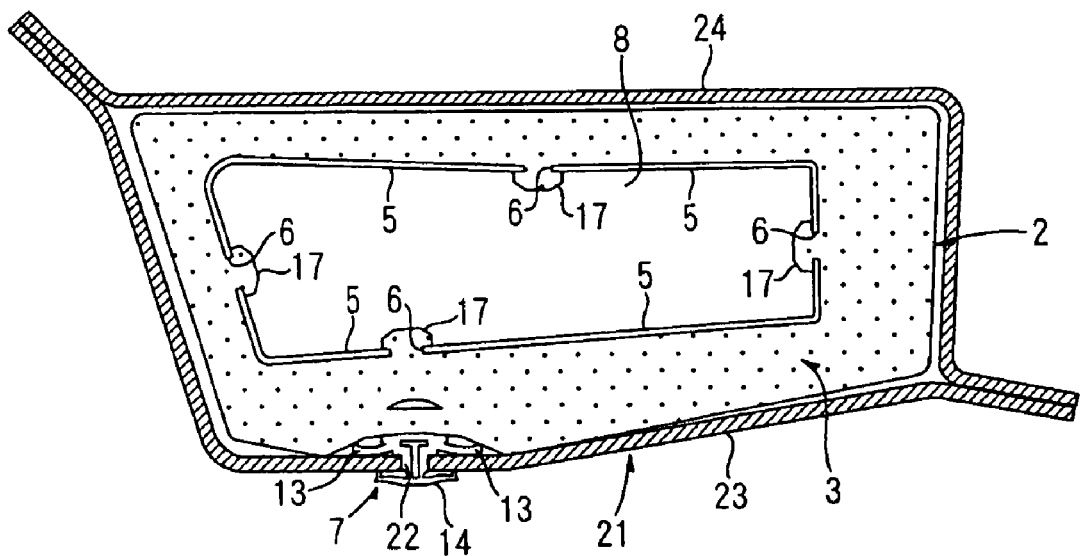
FIG. 6 is a sectional view showing the state of the foam filling member shown in FIG. 1 being placed in an interior space of a pillar.

In this method, the foam filling member 1 having the supporting plate 4 formed to correspond in shape and size to a closed cross section of the interior space of the pillar 21 to be filled is set in the pillar 21, first, as shown in FIG. 6. When the foam filling member 1 is set in the interior of the pillar 21, the mounting portion 7 of the foam filling member 1 is retained in a pre-formed retaining hole 22 of the pillar 21.

To be more specific, the outer retaining portion 14 of the mounting portion 7 is inserted in the retaining hole 22. The outer retaining portion 14 is elastically deformed inwardly in a widthwise direction thereof, while passing through the retaining hole 22. On the other hand, after passing through the retaining hole 22, it is elastically deformed outwardly in the widthwise direction and brought into elastic contact with an outer surface of the pillar 21. In this state, the inner retaining portion 13 of the mounting portion 7 is put in elastic contact with an inner surface of the pillar 21. As a result of this, the pillar 21 is sandwiched between the outer retaining portion 14 and the inner retaining portion 13 and thereby the foam filling member 1 is fixed to the pillar 21.

The pillar 21 comprises an inner panel 23 and an outer panel 24 having a cross section of a generally recessed form. It is formed in the closed cross section by the process that after the foam filling member 1 is placed on the inner panel 23, the inner panel 23 and the outer panel 24 are brought into abutment with each other at both ends thereof and joined together by welding. Specifically, this pillar 21 is used for a front pillar, a side pillar or a rear pillar of a vehicle body.

Figure 7:
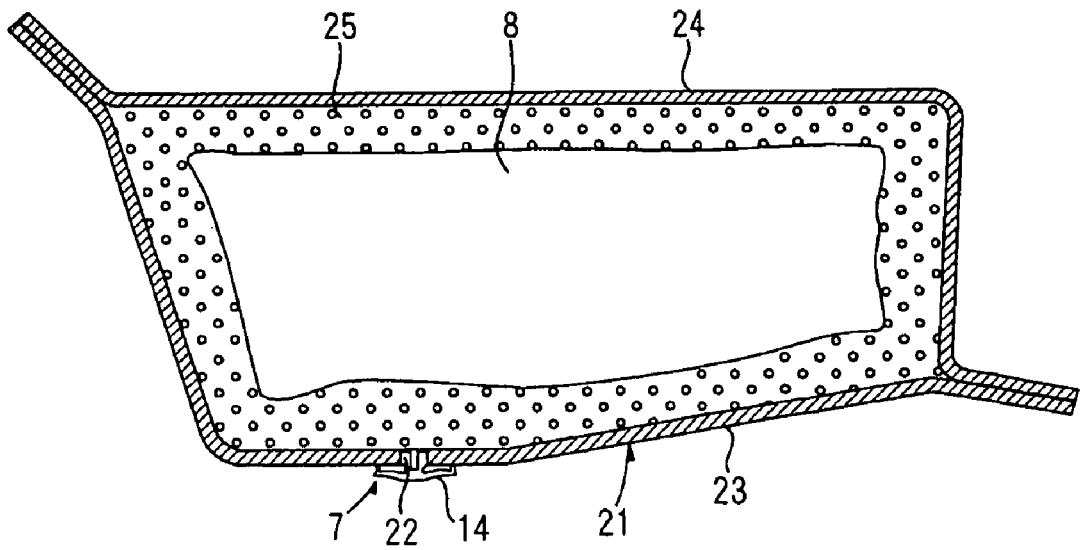
FIG. 7 is a sectional view showing the state of the foaming base material being foamed from the state of FIG. 6.

Then, after this pillar 21 is subjected to required treatments, such as a rust-proof treatment, the foaming base material 3 of the foam filling member 1 is foamed and cured by heating (at a temperature of the order of 120-210° C.) in a subsequent process such as, for example, a drying line process at the baking finish, to thereby produce the foam 25, whereby the interior space of the pillar 21 is filled up with the foam 25, leaving no space therein, as shown in FIG. 7.

It is preferable that the foam 25 has a density (weight (g) of foam/volume ($cm^3$) of foam) of e.g. 0.04-0.2 $g/cm^3$, or preferably 0.05-0.1 $g/cm^3$. Also, it is preferable that the foaming material is foamed at a foam ratio of five to twenty-five times, or preferably ten to twenty times, to obtain the foam 25.

In the foam filling member 1, a central space of the foam filling member 1 is closed by the inner closed portion 8 of the supporting plate 4 and also a space between around the outer edge of the supporting plate 4 and the structure is filled with the foam 25. Thus, in the formation of the foam 25, the whole space of the structure to be filled can be filled up, leaving no space therein.

Also, in the foam filling member 1, since the annular foaming portion 16 can be foamed in the state of being embedded in the embedding portion 15, the structure can be filled up further reliably at a portion thereof on which the mounting portion 7 is to be mounted, as well.

Also, in the foam filling member 1, since the foam of the foaming base material 3 is prevented from progressing toward the back side of the supporting plate 4 on the other side thereof by the supporting plate 4, the foam filling toward the back side of the supporting plate 4 on the other side thereof can be regulated.

Further, the foam filling of the annular foaming portion 16 toward the inner closed portion 8 of the annular wall 5 can be suppressed by the annular wall 5. Thus, the space of the structure can be filled up effectively, leaving no space therein, while a quantity of foaming base material 3 used is reduced.

Besides, in the foam filling member 1, since the annular wall 5 is formed to have a height larger than a thickness of the foaming base material 3, the annular foaming portion 16, when foamed, can be further reliably prevented from flowing over the annular foaming portion 16 and filling into the inner closed portion 8. Thus, the space of the structure can be filled up further reliably, leaving no space therein, while a quantity of foaming base material 3 used is reduced.

In the foam filling member of the present invention, the shape of the supporting plate and annular wall of the holder is not limited to the one mentioned above, and any shape may be properly selected for them in accordance to the space of the structure to be filled. Also, any number and any shape may also be selected for the openings properly in accordance to the space of the structure to be filled. In addition, the shape of the foaming base material is not limited to the one mentioned above, and any shape may be properly selected for it in accordance to the shape of the supporting plate and the shape of the annular wall. Further, the number of lugs and the shape of the same and the shape of the protruding portions are not limited to those mentioned above, and any number and an shape may be selected for them properly.

Figure 8:
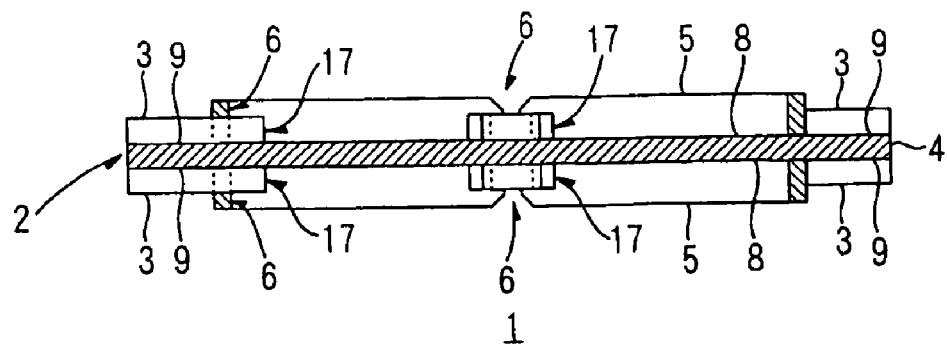
FIG. 8 is a side sectional view showing another embodiment of the foam filling member of the present invention (wherein the foaming base material is supported at each side of the supporting plate)

Although the arrangement in which the annular wall 5 and the engaging portions 6 are arranged on a single side of the supporting plate 4 has been illustrated above, the annular wall 5 and the engaging portions 6 may be arranged on each side of the supporting plate 4, while also the foaming base material 3 may be supported on each side of the supporting plate 4, as shown in FIG. 8, for example.

This arrangement of the foaming base material 3 being supported on each side of the supporting plate 4 can allow the foaming base materials 3 to be foamed on both sides of the supporting plate 4, and as such can allow the sufficient foam filling of the foam 25. Also, this arrangement can allow simultaneous foam filling in a symmetrical hollow structure like the pillar 21 mentioned above by using the same supporting plate 4.

Figure 9:
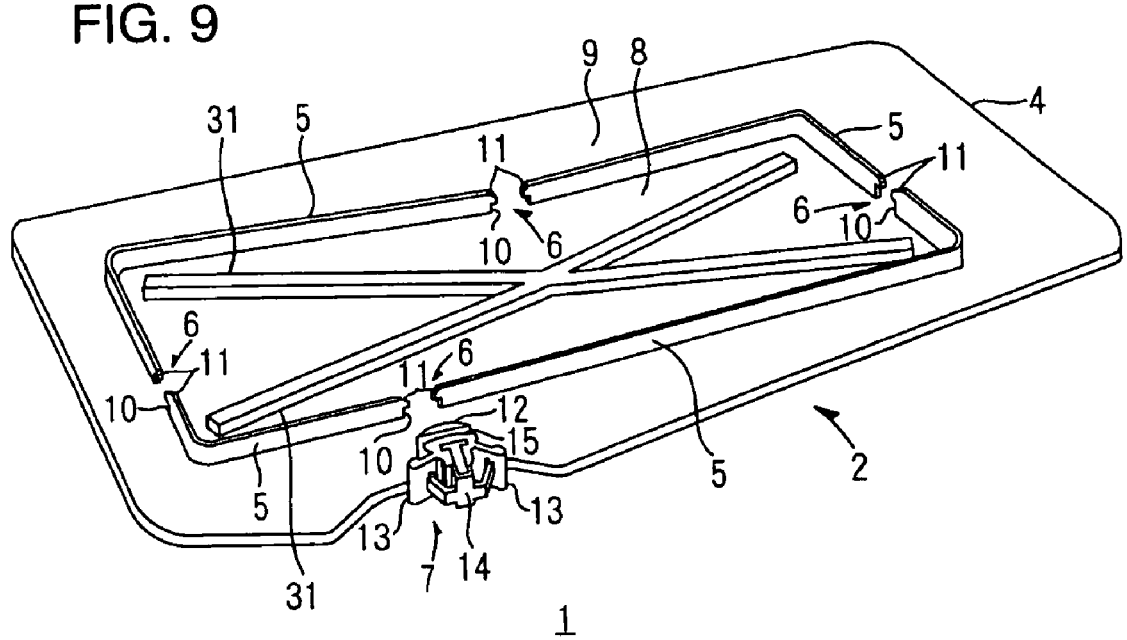
FIG. 9 is a perspective view showing still another embodiment of the holder of the foam filling member shown in FIG. 1 (wherein a reinforcing rib is provided in an inner closed portion).

In addition, for example, a reinforcing rib 31 may be provided in the inner closed portion 8 surrounded by the annular wall 5 in the supporting plate 4, as shown in FIG. 9. No particular limitation is imposed on the reinforcing rib 31. For example, a X-shaped reinforcing rib, when viewed from top, may be provided in the inner closed portion 8. The reinforcing rib 31 is formed to have a height slightly lower than that of the annular wall 5 and is set to be within the range of e.g. 0.5-5.0 mm, or preferably 1.0-2.0 mm.

While the illustrative embodiments of the present invention are provided in the above description, such is for illustrative purpose only and it is not to be construed restrictively. Modification and variation of the present invention that will be obvious to those skilled in the art is to be covered by the following claims.

What is claimed is:

1. A foam filling member used for filling a space of a structure, comprising:
    a foaming base of foamable material, comprising:
        an annular foaming portion having a hollow interior area;
        a protrusion that extends from the annular foaming portion into the hollow interior area;
    a holder that is formed of non-foamable material and is adapted to support the foaming base thereon, the holder comprising:
        a supporting plate for supporting the foaming base;
        an annular wall that extends from a first surface of the supporting plate in a direction that is substantially orthogonal to an extending direction of the supporting plate, the annular wall having a ring-shaped form that defines an interior area of the supporting plate inside of the annular wall and an exterior area of the supporting plate outside of the annular wall, wherein the foaming base is provided along the exterior area of the supporting plate; and
        an engaging portion that is defined in the annular wall receiving the protrusion from the foaming base, the engaging portion having a perimeter with an opening defined in the perimeter.

2. The foam filling member according to claim 1, wherein the foaming base is formed in sheet form.

3. The foam filling member according to claim 2, wherein the annular wall extends from the surface of the supporting plate to a height that is larger than a thickness of the foaming base.

4. The foam filling member according to claim 1, wherein the engaging portion of the holder has a slit opening that is defined in the annular wall, and wherein the protrusion of the foaming base includes a lug that projects through the slit opening of the annular wall into the interior area of the supporting plate.

5. The foam filling member according to claim 4, wherein the protrusion of the foaming base includes projections that extend from the lug in a circumferential direction of the annular wall, the projections being adapted to engage an inside surface of the annular wall.

6. The foam filling member according to claim 1, wherein the holder further comprises:
    a mounting portion for mounting to the structure, the mounting portion having an embedding portion that is adapted to embed part of the foaming base.

7. The foam filling member according to claim 1, further comprising:
    a second foaming base;
    wherein the holder further comprises:
        a second annular wall that extends from a second surface of the supporting plate in a direction that is orthogonal to the extending direction of the supporting plate, the second surface being opposite from the first surface; and
        a second engaging portion formed on the second annular wall, wherein the second foaming base is supported on the second surface of the supporting plate.

8. A foam filling member used for filling a space of a structure, comprising:
    a holder formed of non-foamable material, and
    a foaming base material of foamable material,
    wherein the holder comprises a supporting plate for supporting the foaming base material, an annular wall standing from the supporting plate in a direction orthogonal to an extending direction of the supporting plate and formed in a ring-shaped form to define a space in the inside of the annular wall, and an engaging portion, provided in the annular wall, to engage with the foaming base material,
    wherein the foaming base material comprises an annular foaming portion on the supporting plate supported on an outer circumferential portion of the annular wall, and an engaged portion that engages the engaging portion, and
    wherein the engaging portion of the holder has a slit opening that is defined in the annular wall, and claw portions, projected inwardly of the opening along a circumferential direction of the annular wall, wherein the engaged portion of the foaming base includes a lug that projects through the opening of the annular wall into an interior area of the supporting plate, and
    wherein the lug is held in sandwich relation between the supporting plate and the claw portions.

* * * * *